(12) United States Patent
O'Brien

(10) Patent No.: US 7,900,510 B1
(45) Date of Patent: Mar. 8, 2011

(54) MARINE TROLLING SENSOR

(76) Inventor: Edwin O'Brien, Manasquan, NJ (US)

( * ) Notice: Subject to any disclaimer, the term of this patent is extended or adjusted under 35 U.S.C. 154(b) by 262 days.

(21) Appl. No.: 11/762,771

(22) Filed: Jun. 13, 2007

(51) Int. Cl.
*G01F 23/00* (2006.01)
(52) U.S. Cl. .......................................................... 73/295
(58) Field of Classification Search ...................... 73/295
See application file for complete search history.

(56) References Cited

U.S. PATENT DOCUMENTS

| | | | |
|---|---|---|---|
| 3,786,586 A | | 1/1974 | Swan |
| 4,425,795 A | * | 1/1984 | Albrecht et al. ................ 73/295 |
| 4,901,061 A | * | 2/1990 | Twerdochlib ................ 340/604 |
| 5,148,376 A | * | 9/1992 | Sato ................ 702/50 |
| 5,191,719 A | | 3/1993 | Kitt |
| 5,469,739 A | * | 11/1995 | McGuire ........................ 73/301 |
| 5,737,246 A | * | 4/1998 | Furukawa et al. ............ 702/166 |
| 6,164,385 A | * | 12/2000 | Buchl ............................ 172/239 |
| 6,216,795 B1 | * | 4/2001 | Buchl ................................ 172/7 |
| 6,325,683 B1 | * | 12/2001 | Yocom ............................... 440/6 |
| 6,378,801 B1 | * | 4/2002 | Pell et al. ..................... 244/3.24 |
| 7,113,449 B2 | | 9/2006 | Fairbairn |
| 2006/0191185 A1 | * | 8/2006 | Hansen .......................... 43/27.4 |
| 2007/0220798 A1 | * | 9/2007 | Davidson ........................... 43/4 |

OTHER PUBLICATIONS

"Determining Downrigger depth when Trolling", http://www.lakemichiganangler.com/tips/downrigger_depth.htm (admitted prior art).
"Cannon Speed-N-Temp Monitor with Cannon Speed-N-Temp Sensor", http://web.archive.org/web/20050203183306/http://www.marine-engine-parts.com/Cannon.html (admitted prior art).
"GTM 40 Depth and Temperature Meter", http://www.dornoch-outdoor.co.uk/fishing/fishaccess/gtm40/htm printed Oct. 6, 2006.

* cited by examiner

*Primary Examiner* — Hezron Williams
*Assistant Examiner* — Rodney T Frank
(74) *Attorney, Agent, or Firm* — Muskin & Cusick LLC

(57) ABSTRACT

A method and apparatus to implement a trolling device. The trolling device can assist maritime sports fishermen in defining the actual water depth and/or water temperature of the location at which a lure is situated in troll. The readings from the device enable an angler to adjust variables such as boat speed, length of line deployed and ballast weight to adjust to desired depth. The device comprises a temperature sensor, a pressure sensor, a micro-controller chip, a printed circuit board, an LCD display, and a cycle switch, all housed within a dense metal (for ballast), water-proof body designed specifically for deep marine submersion and in-line trolling. The device has a pre-programmed data-logging algorithm that is activated by a fisherman via a magnetic controlled reed switch prior to letting out trolling line with the device set in-line to the trolling gear. Upon retrieving the device, the fisherman can view the data to place or reset the trolling lures/rigs, as necessary, at the appropriate zone.

12 Claims, 7 Drawing Sheets

MARINE TROLLING SENSOR

BACKGROUND OF THE INVENTION

1. Field of the Invention

The present inventive concept is directed to a method and apparatus to define the depth of a lure that has been deployed behind a fishing vessel while trolling (sport fishing) for various species of fish. It can also be used to measure the temperature of a particular horizon of water. The device is programmed to define the depth and temperature range at a single zone (stratum) of water within a set fixed or programmable amount of time (e.g., 2-minutes with a 5-minute delay).

2. Description of the Related Art

U.S. Pat. No. 5,834,641 discloses a depth gauge with a pressure and temperature sensor and evaluation circuit to record "thermocline" zones at various depths in fresh water lakes. This invention defines temperature zones from a stationary point and is not used "in-line."

U.S. Pat. Nos. 5,351,538 and 5,469,739 (both McGuire) are in-line devices which use circuitry that calculates the maximum depth trolled over any time period.

U.S. Pat. No. 7,113,449 (Fairbairn) discloses a digital processor based system where the angler physically inputs data parameters such as line type, speed, and weight and the processor outputs depth values. The limitation of this device is simply that it is an estimate.

U.S. Pat. No. 3,786,586 (Swan 1974) is another calculated estimate based upon physical geometries of the fishing line and relative fishing speeds.

U.S. Pat. No. 5,191,719 (Kitt 1993), is a manometric gauge that is calibrated with a depth scale that can be used to determine maximum depth during all types of angling. This device is limited to marking only the maximum depth.

What is needed is an improved way to determine or confirm actual trolling depths so that targeted fish marks observed on a fish finding sonar device can be accurately trolled by deploying lures to the correct horizon.

SUMMARY OF THE INVENTION

It is an aspect of the present invention to provide an improved method and device to detect underwater conditions.

The above aspects can be obtained by an apparatus that includes (a) an activation switch; (b) a depth sensor to detect detected depths of the apparatus; (c) a processing unit to compute an average depth for a measuring period of time using the detected depths; and (d) an output unit to output the average depth.

The above aspects can also be obtained by a method that includes (a) putting a measuring device in a body of water; (b) detecting depths of the measuring device; (c) computing an average depth of the depths; and (d) outputting the average depth.

The above aspects can also be obtained by a method that includes (a) an activation switch; (b) a temperature sensor to detect detected temperatures of water surrounding the apparatus; (c) a processing unit to compute an average temperature for a measuring period of time using the detected temperatures; and (d) an output unit to output the average temperatures.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
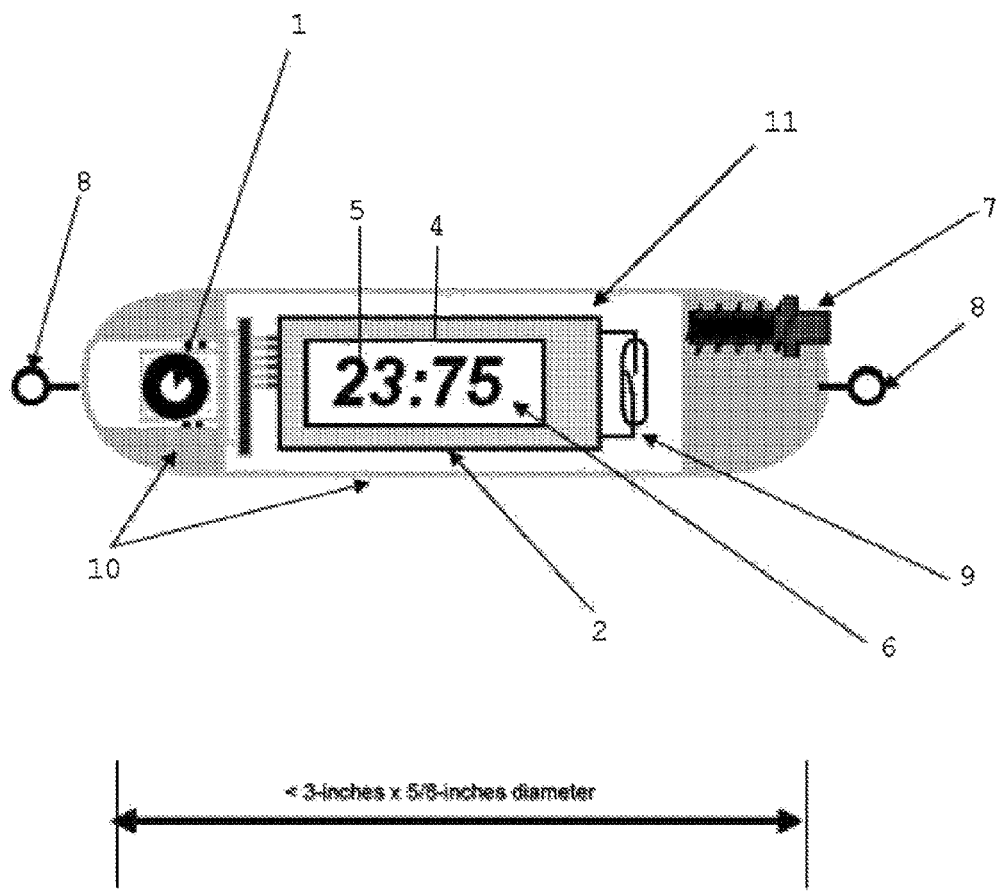
FIG. 1 is a drawing illustrating an exemplary trolling device, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage to implement a trolling device or sensor to detect underwater conditions in order to assist a fisherman/troller.

Currently, in the field of sport fishing/trolling, finding the appropriate trolling depth is accomplished by "trial and error" methods which include, but are not limited to: adjusting vessel speed, deploying different lengths of trolling wire-line, making various ballast adjustments to counterbalance for wind speed, tidal action, and current until achieving the objective of pulling lures through the zone which yields fish.

The inventive concept can eliminate a significant portion of the "trial and error" procedures typically needed to troll lures at the proper depth. For example, an angler can simultaneously deploy several subject devices at different lengths, and in just over five minutes have certainty to which length of line descends to the desired depth.

Sonar (a "fishfinder") can be used to identify a target depth of fish. Thus, once the target depth is known by the troller, then the troller will desire to have the lure stabilized at that particular depth.

The device described herein can display any combination of the following values: (a) depth of the trolled lure; (b) temperature of the water horizon at the depth of the trolled lure; (c) visibility as measured by light intensity; (d) lure speed. Further, the following values may not be displayed (although they can be) but can be related factors when trolling: (e) appropriate length of fishing line to deploy to achieve the desired depth; (f) proper vessel trolling speed in which to operate to achieve the desired depth; and (g) other influences related to the disposition of the trolled lure.

The device is comprised of a temperature and pressure sensor connected to a micro-controller coded with an algorithm programmed to collect seawater temperature (F) and seawater depth (Ft.) measurements and provide an average over a specified time period. The averaged values are displayed on a tiny 4 decimal place Liquid Crystal Display. All of the electric components are mounted on a tiny printed circuit board powered by a lithium battery cell. The device is partially encapsulated in a dense metallic body (for ballast) waterproofed with clear epoxy resin. The device is constructed with eyelet loops at each end so that the device can be affixed "in-line" to wire or monofilament trolling lines prior to the trolling lure.

Data from the device can be obtained by depressing the magnetic button on the exterior of the device to prompt a display of the depth and temperature at the trolled depth. A five minute delay can be programmed into the micro-controller so that the angler has adequate time to deploy the trolling lines and lures to the estimated location/depth.

The Device can be very small (e.g., smaller than 3-inches by ⅝-inches) and can have a typical battery life of approximately 5-years. The device would provide information to trolling fishermen who can increase the odds of success in fishing as well as saving valuable time in understanding how and where to troll lures.

FIG. 1 is a drawing illustrating an exemplary trolling device, according to an embodiment.

A pressure and temperature sensor 1 detects water pressure and water temperature, and transmits this information to a processing unit. A printed circuit board with a micro-controller chip 2 is inside the device and implements the processing unit. An output device 4 is used to output values on the device, such as the average depth, average temperature, or any other value described herein. The output device 4 can use a liquid crystal display (LCD) or any other mechanism to output values. A depth read-out 5 shows the average depth (23 feet in this example). A temperature read-out 6 shows the average temperature 75 degrees in this example.

A magnetic spring loaded cycle button (7) is used to house a magnet which is needed to actuate the device/reset the device program procedure via the reed switch (9). A reed switch (9) is a normally open circuit switch which is closed when the magnet (7) comes into proximity, thereby actuating the device. The fishing line (not pictured) can be strung through the in-line eyelets (8). The device encasement can be made from a dense metal housing (10), wherein it is adapted to accommodate the electronics. Clear epoxy 3 can be bonded to the metal housing in order to protect the circuitry.

Figure 2:
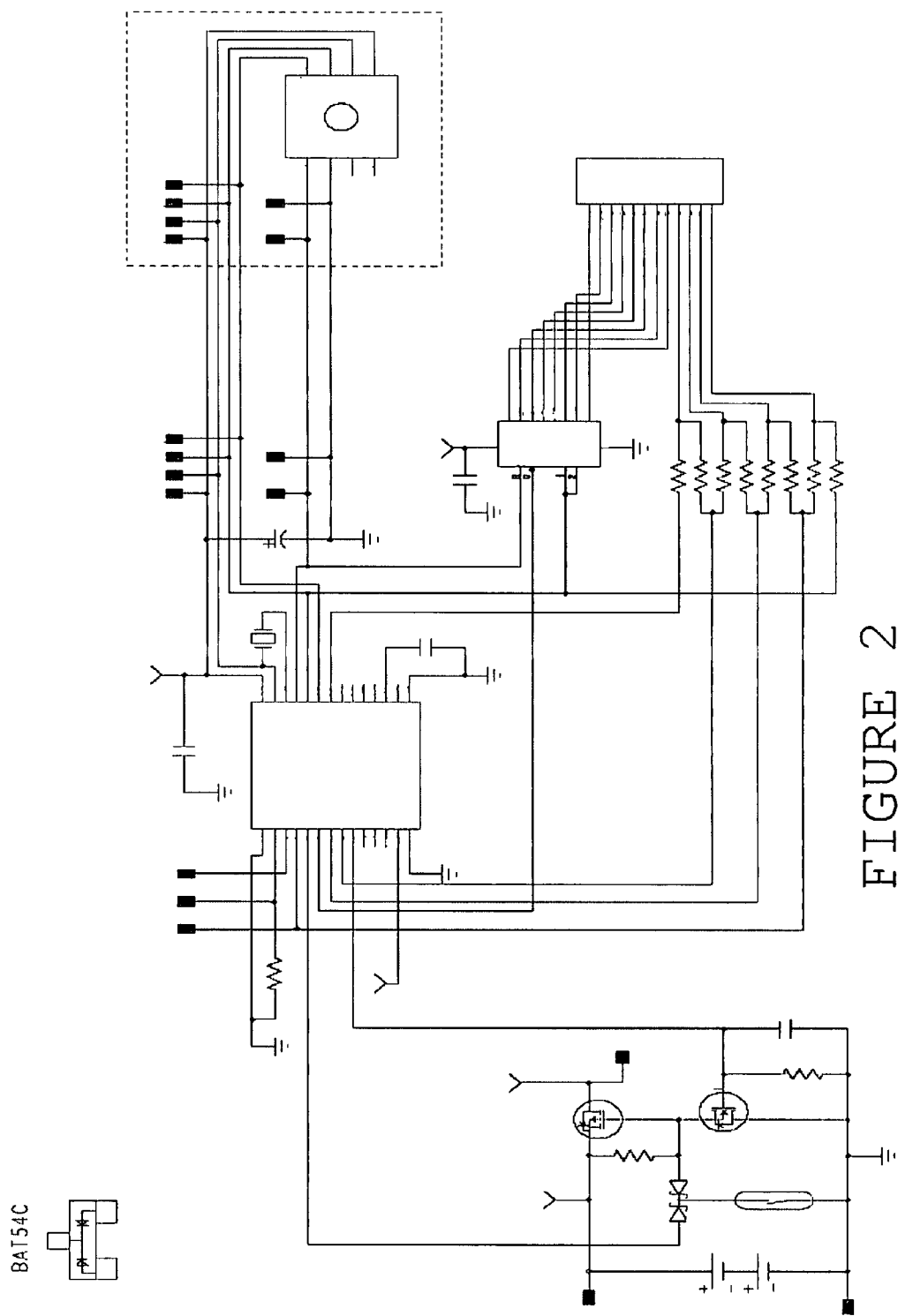
FIG. 2 is a schematic diagram illustrating exemplary circuitry to implement a trolling device, according to an embodiment.

FIG. 2 is a schematic diagram illustrating exemplary circuitry to implement a trolling device, according to an embodiment. This circuitry illustrates merely one example of a schematic that can implement the inventive concept, and it can be appreciated that other implementations can be devised as well.

Figure 3:
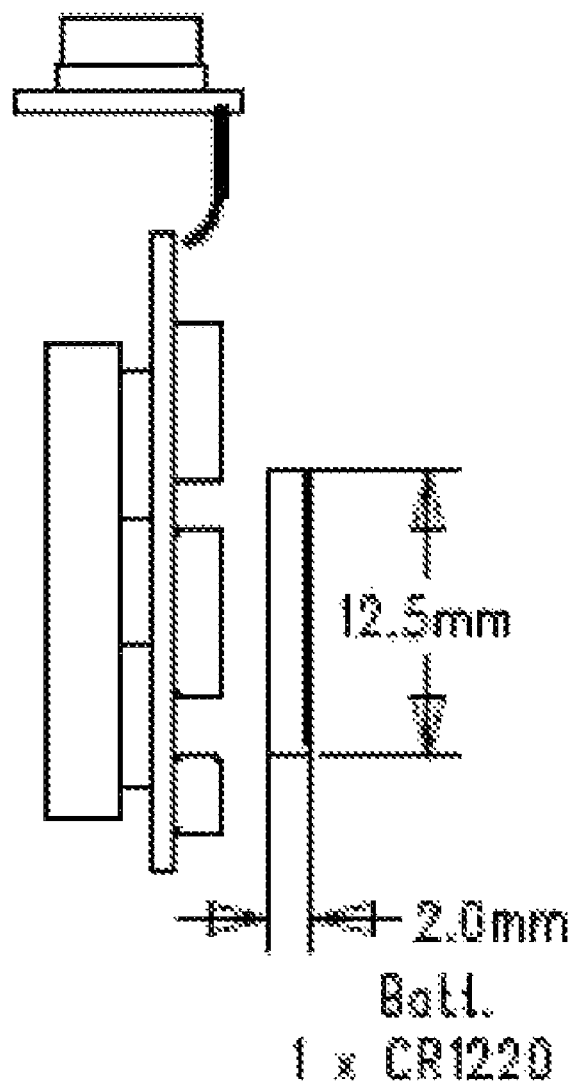
FIG. 3 is a diagram illustrating a cross section of exemplary circuitry to implement a trolling device, according to an embodiment.

FIG. 3 is a diagram illustrating a cross section of exemplary circuitry to implement a trolling device, according to an embodiment.

Figure 4:
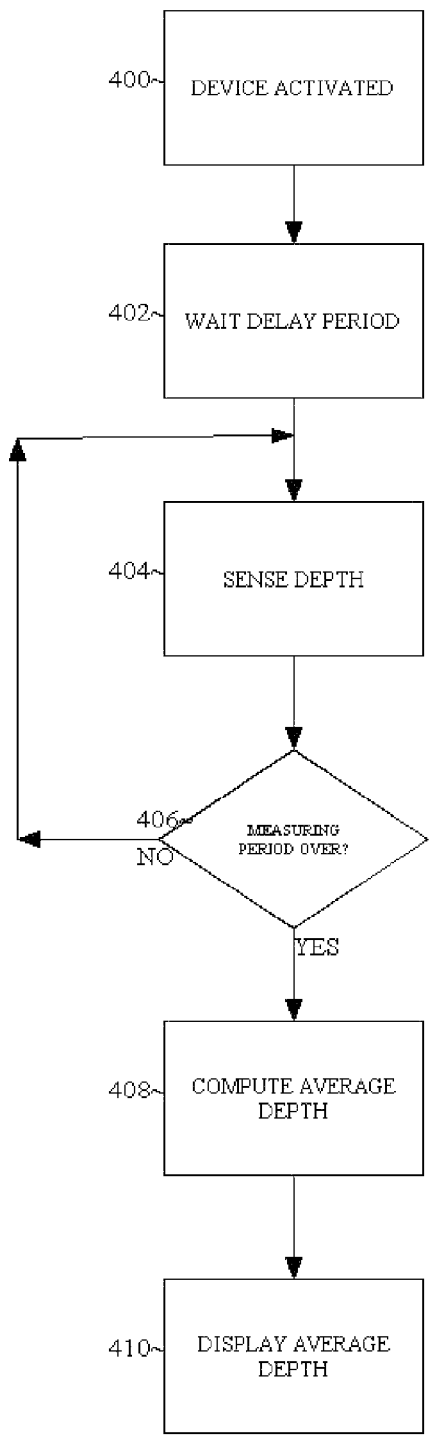
FIG. 4 is a flowchart illustrating an exemplary method to measure depths, according to an embodiment.

FIG. 4 is a flowchart illustrating an exemplary method to measure depths, according to an embodiment.

The method can begin with operation 400, in which the device is activated. This can be typically accomplished when a user of the device depresses a button on the device to activate it.

During operation 400 (or before it), the delay period used in operation 402 and/or the measuring frequency used in operations 404/406 can be programmed by the user by pressing buttons on the device. Alternatively, these value(s) can be pre-programmed on the device itself.

From operation 400, the method proceeds to operation 402, which initiates a delay period. A processing unit in the device can include a timer (either implemented by hardware or software) which would control the delay period. The reason for waiting the delay period is to provide the angler adequate time to release line for the device to fall to a depth where it will typically stay. Also, when the user depresses a button on the device (in operation 400) to activate the device, the device would typically be above the water and thus the depth sensor may not return any valuable data. Thus, it is desirable to encode a delay period before using depth data detected by the device. The delay period may also optionally be set by the user (e.g., by pressing buttons on the device in order to indicate his desired delay period).

From operation 402, the method can proceed to operation 404, which starts detecting (or sensing) depths once the delay period is over. Alternatively, the method (device) can continuously detect depths even during the delay period (or even at all times), however only detected depths that occur during a measuring period are used in data that is outputted to the user. The measuring period can start after the delay period and can end after a measuring period is over. Depths can be detected at predetermined intervals (e.g., every second, every ten seconds, every twenty seconds, etc.)

Depths that are detected can either be stored in a memory (e.g., RAM, etc.) for later use in computing an average. Alternatively, depths can be aggregated along with a number of detected depths so that when detecting the depths is completed, the average can be taken. For example, if depths are to be measured for ten seconds, then each measurement can be taken every second and aggregated, and after ten measurements are taken, the aggregate can then be divided by ten to determine the average.

From operation 404, the method can proceed to operation 406, which determines whether the measuring period is over. This can be done by using a timer, counting clock cycles, or any other method known in the art. If not, then the method can return to operation 404 which continues to detect depth.

If the determination in operation 406 determines that the measurement period is over, then the method can proceed to operation 408, which computes an average depth. This can be done as described above, by aggregating (if they are not already aggregated) all of the discrete measurements by the device into one value and dividing them by the number of measurements to determine the average. Once the measuring period is over the detecting can also stop (although in another embodiment the detector can continue to detect, although the results of these detections are not used).

From operation 408, the method can proceed to operation 410, which displays the average depth. The display can automatically be displayed on the device once the average depth has been computed, or it can be displayed upon activation of a button on the device by a user.

In addition, a light intensity sensor can be connected to the device in the same manner that the temperature sensor and the depth sensor can be used. Thus, an average light intensity can be measured over a period of time (after a delay period) and outputted, in the same way that depths can be processed, computed and outputted, for example as illustrated in FIG. 4. The light intensity sensor can be another way to measure depth, since the deeper into the water, the lower the light intensity.

In addition, a speed sensor can be connected to the device in the same manner that the temperature sensor and the depth sensor can be used. Thus, an average speed can be measured over a period of time (after a delay period) and outputted, in the same way that depths can be processed, computed, and outputted, for example as illustrated in FIG. 4.

Figure 5:
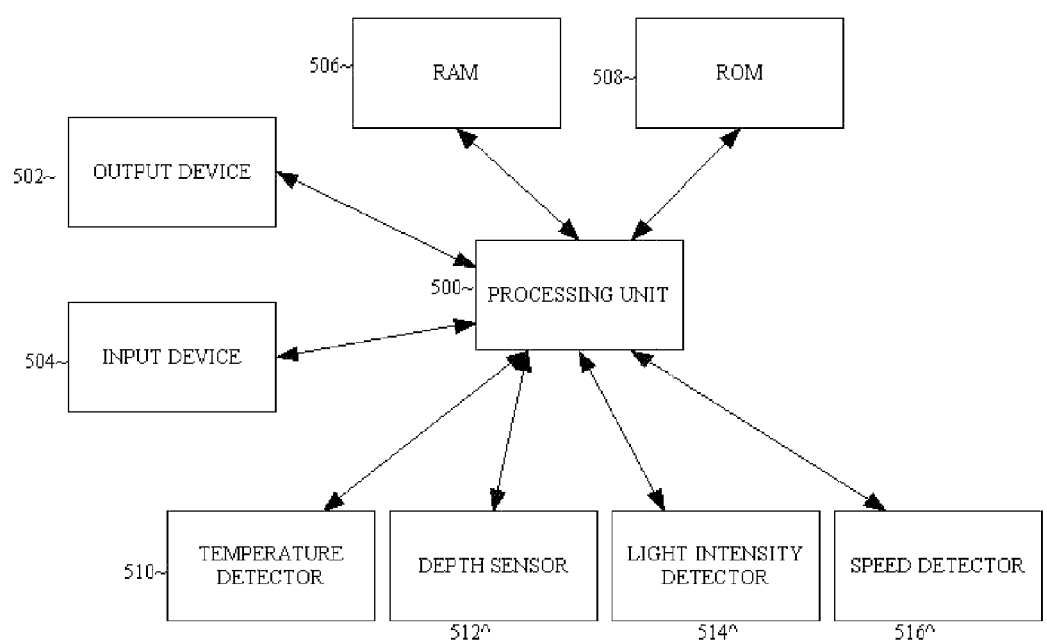
FIG. 5 is a block diagram illustrating exemplary hardware that can be used to implement an embodiment.

FIG. 5 is a block diagram illustrating exemplary hardware that can be used to implement an embodiment.

A processing unit 500 can be a microprocessor and any associated components known in the art, such as a system bus, memory, etc. The processing unit 500 is connected to an output device 502 which can be an LCD display or any other type of display that can display digital information. The processing unit 500 is also connected to an input device 504 which can be buttons, a touch screen, etc. The processing unit can also be connected to a RAM 506 and a ROM 508.

The processing unit 500 can also be connected to a temperature detector 510 and/or a depth sensor 512 and/or a light intensity detector 514 and/or a speed detector 516.

An example of a use of a device described herein is as follows. A fisherman attaches the device in-line prior to the trolling lure at the start of a trolling run. The fisherman can then depress an activation button on the device which then delays five minutes (although any delay period can be used) before it starts detecting. The fisherman then throws the lure along with the device into the water. After the five minute delay period ends, the device starts measuring depths at a frequency of every 20 seconds for two more minutes (for a total of 6 depth measurements). The device also starts measuring temperatures every 20 seconds for the two additional minutes (for a total of 6 temperature measurements.) It is noted that the delay period, measuring period, and measuring frequency do not have to be identical to the values used for the depth detecting. Thus, after seven minutes from the time the device was activated by the fisherman, the device can stop detecting. Each depth measurement is added to a running depth total, and each temperature measurement is added to a running temperature total. When the two minute measuring period is over, the sum total of all 6 depth measurements can be divided by 6 to determine the average depth for the measuring period. The sum total of all 6 temperature measurements can be divided by 6 to determine the average temperature for the measuring period. Both the average depth and the average temperature can then be automatically stored into memory on the device. The fisherman can then reel in the device and depress the activation button and look at an output on the device to see its average depth and temperature. The fisherman can then use this information to his advantage, for example, if the line went shallower than the fisherman desired, the fisherman can then release a longer length of fishing line or slow the boat speed during the next time the attempts lure is trolled.

Figure 6:
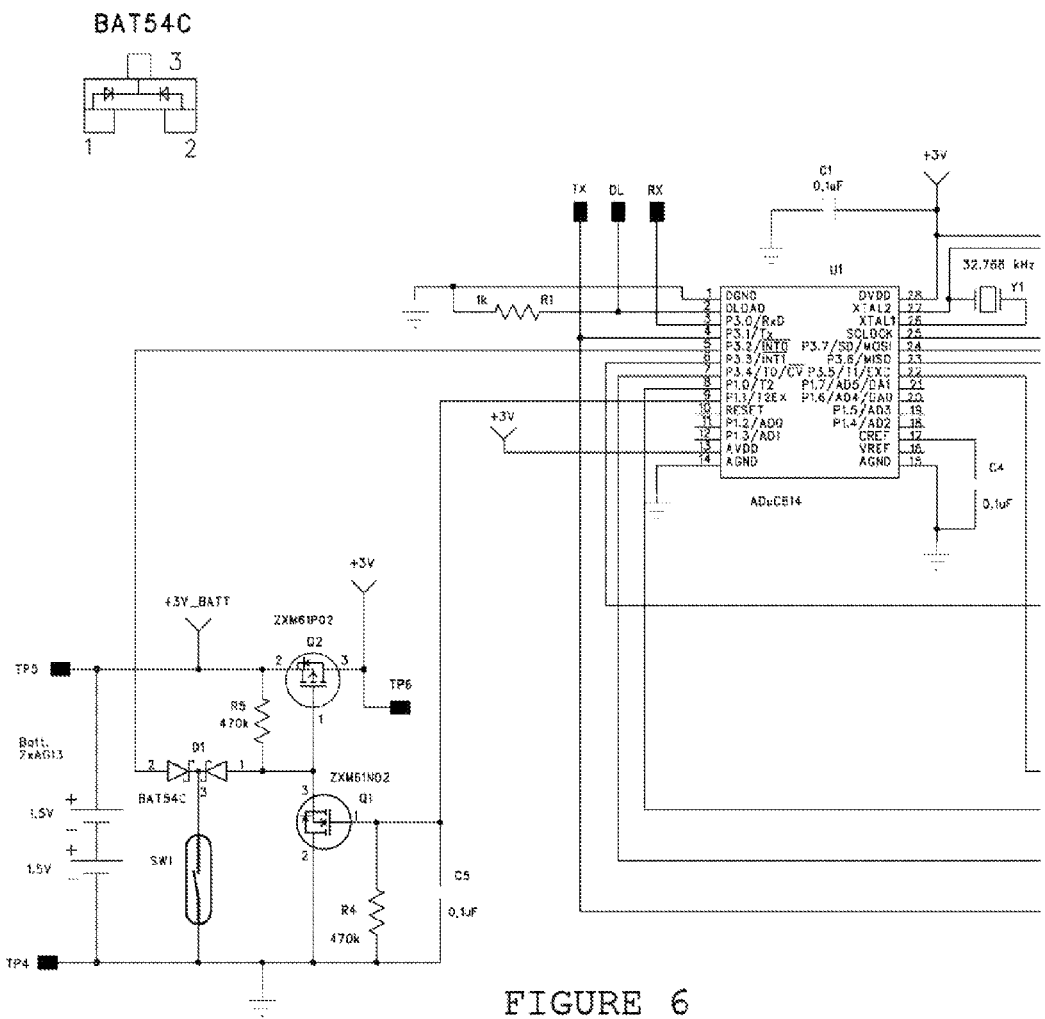
FIG. 6 is a schematic diagram of the left half of the schematic diagram illustrated in FIG. 2.
Figure 7:
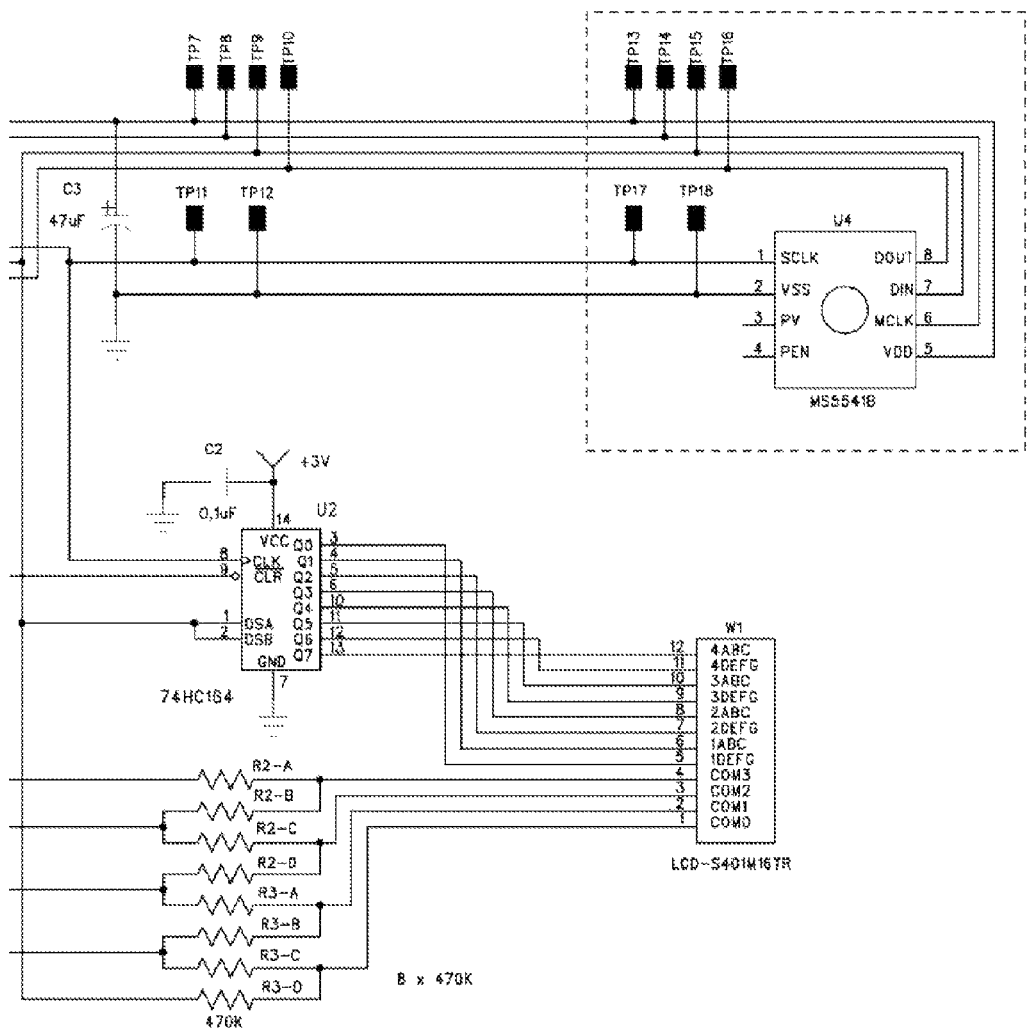
FIG. 7 is a schematic diagram of the right half of the schematic diagram illustrated in FIG. 2.

FIG. 6 is a schematic diagram of the left half of the schematic diagram illustrated in FIG. 2. FIG. 7 is a schematic diagram of the right half of the schematic diagram illustrated in FIG. 2.

It is noted that any of the operations described herein can be performed in any sensible order. Further, any operations may be optional. Also, any feature or embodiment described herein can be combined with any other.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:
    an activation switch;
    a depth sensor comprising a pressure sensor to detect detected depths of the apparatus;
    a processing unit, controlled by the activation switch, to compute an average depth for a measuring period of time using the detected depths from the depth sensor; and
    an output unit to output the average depth,
    wherein the measuring period of time starts after waiting a delay period after the activation switch is activated to allow the apparatus to settle and ends after a measuring period of time elapses thereafter,
    wherein after the measuring period expires the average depth remains constant and is unaffected by further depths of the apparatus,
    wherein the delay period is set by a user using button(s) on the apparatus.

2. The depth sensing apparatus as recited in claim 1, wherein the measuring period is set by a user using buttons on the apparatus.

3. The depth sensor as recited in claim 1, further comprising a temperature sensor to detect detected temperatures of water surrounding the apparatus.

4. An apparatus, comprising:
    an activation switch;
    a depth sensor comprising a pressure sensor to detect detected depths of the apparatus;
    a processing unit, controlled by the activation switch, to compute an average depth for a measuring period of time using the detected depths from the depth sensor; and
    an output unit to output the average depth,
    wherein the measuring period of time starts after waiting a delay period after the activation switch is activated to allow the apparatus to settle and ends after a measuring period of time elapses thereafter,
    wherein after the measuring period expires the average depth remains constant and is unaffected by further depths of the apparatus,
    wherein the measuring period is set by a user using buttons on the apparatus.

5. The apparatus as recited in claim 4, further comprising a temperature sensor to detect detected temperatures of water surrounding the apparatus.

6. An apparatus, comprising:
    an activation switch;
    a depth sensor comprising a pressure sensor to detect detected depths of the apparatus;
    a processing unit, controlled by the activation switch, to compute an average depth for a measuring period of time using the detected depths from the depth sensor;
    an output unit to output the average depth;
    a temperature sensor to detect detected temperatures of water surrounding the apparatus,
    wherein the measuring period of time starts after waiting a delay period after the activation switch is activated to allow the apparatus to settle and ends after a measuring period of time elapses thereafter,
    wherein after the measuring period expires the average depth remains constant and is unaffected by further depths of the apparatus,
    wherein the processing unit computes an average temperature for the measuring period of time using the detected temperatures.

7. A depth sensing apparatus, comprising:
    an activation switch;
    a depth sensor to detect detected depths of the apparatus;

a processing unit, controlled by the activation switch, to compute an average depth for a measuring period of time using the detected depths from the depth sensor;

an output unit to output the average depth; and a speed sensor to detect detected speeds and compute an average speed over a period of time, and output the average speed to the output unit of the depth sensing apparatus.

8. A depth sensing apparatus, comprising:

an activation switch;

a depth sensor to detect detected depths of the apparatus;

a processing unit, controlled by the activation switch, to compute an average depth for a measuring period of time using the detected depths from the depth sensor;

an output unit to output the average depth; and a light intensity sensor to provide light intensity data which is used to measure depth.

9. A method to measure depth, the method comprising:

providing a measuring device comprising: a pressure sensor to measure depth and a processing unit;

putting the measuring device in a body of water and allowing the measuring device to settle in the body of water;

waiting a delay period by the processing unit;

detecting detected depths of the measuring device by the pressure sensor;

computing an average depth of the detected depths by the processor for a measuring period of time;

detecting detected temperatures of water adjacent to the measuring device;

computing an average temperature of the detected temperatures;

removing the measuring device from the water;

outputting the average depth on a display on the measuring device; and outputting the average temperature, wherein depths that are used in the computing the average depth are detected only during the measuring period of time which starts immediately after the delay period, wherein after the measuring period of time has expired, further depths of the measuring device do not affect the average depth.

10. The method as recited in claim 9, further comprising:

waiting a delay period before detecting depths that are used in the computing.

11. The method as recited in claim 10, wherein the detecting depths is performed during a measuring period of time, which starts after the delay period.

12. The method as recited in claim 9, wherein depths that are used in the computing are detected during a measuring period of time.

* * * * *